Sept. 16, 1941.　　　E. M. SPLAINE　　　2,255,831
OPHTHALMIC MOUNTING
Filed June 29, 1938
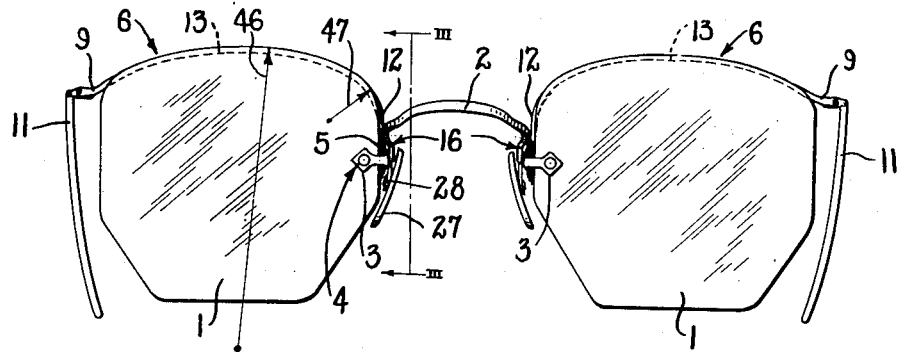
Fig. I
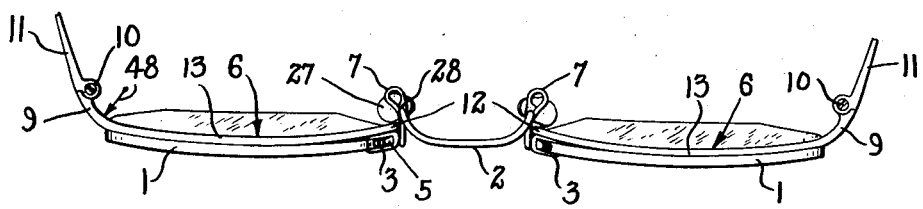
Fig. II
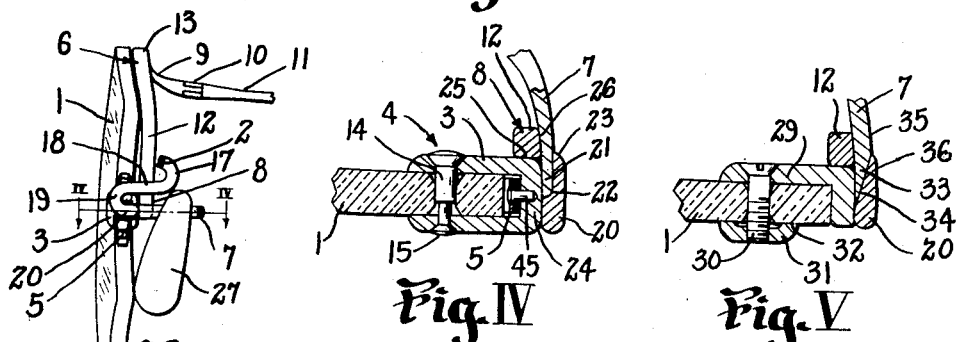
Fig. III　　　Fig. IV　　　Fig. V
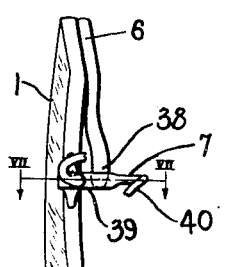
Fig. VI
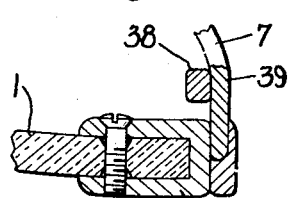
Fig. VII
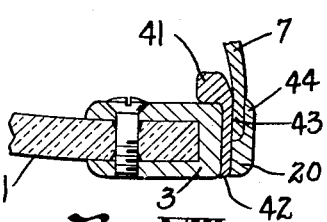
Fig. VIII
INVENTOR.
EDWARD M. SPLAINE
BY Harry H. Styll
ATTORNEY.

Patented Sept. 16, 1941

2,255,831

UNITED STATES PATENT OFFICE 2,255,831

OPHTHALMIC MOUNTING

Edward M. Splaine, Southbridge, Mass., assignor to American Optical Company, Southbridge, Mass., a voluntary association of Massachusetts Application June 29, 1938, Serial No. 216,532

5 Claims. (Cl. 88—42)

This invention relates to improvements in ophthalmic mountings and has particular reference to improved means of making the same.

One of the principal objects of the invention is to provide a novel rimless type ophthalmic mounting having temple supporting means connected adjacent the attachments of the bridge member to the lenses and which are shaped to extend substantially throughout the upper contour edges of the lenses and to which the temples are pivotally attached adjacent the upper temporal edges of the lenses whereby the said temple supports will have a relatively rigid and durable connection at their points of attachment to said mounting.

Another object of the invention is to provide novel means of assembling and securing the supporting parts of the mounting together.

Another object is to provide a construction of an ophthalmic mounting having the above characteristics whereby the said parts may be joined by a single soldering operation.

Another object is to provide a construction of ophthalmic mountings having the above characteristics wherein the said temple supporting means may be simultaneously connected with the lens straps and nose bearing pad supporting means of such mountings.

Another object is to provide a construction of ophthalmic mountings having the above characteristics wherein the said temple supporting means may be attached to the lens straps, nose bearing pad supporting means and ends of the bridge member to provide a relatively rigid, durable and compact attachment where the parts may be all joined together simultaneously or separately connected with each other.

Another object of the invention is to provide improved means of joining together the parts of an ophthalmic mounting having the above characteristics whereby the bridge sizes standardized in the art may be used in forming such mountings.

Another object is to provide an ophthalmic mounting of the above character with lens means resiliently supported to relieve shock and strain thereon during use.

Other objects and advantages of the invention should become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawing:

Fig. I is a front elevation of an ophthalmic mounting embodying the invention;

Fig. II is a plan view of Fig. I;

Fig. III is a sectional view taken as on line III—III of Fig. I and looking in the direction indicated by the arrows;

Fig. IV is an enlarged fragmentary sectional view taken as on line IV—IV of Fig. III;

Fig. V is a view generally similar to Fig. IV of a modified form of the invention;

Fig. VI is a view generally similar to Fig. III of a further modified form of the invention;

Fig. VII is an enlarged fragmentary sectional view taken as on line VII—VII of Fig. VI; and Fig. VIII is a view generally similar to Fig. VII of a further modification.

This invention resides in the provision of an ophthalmic mounting having rimless type lenses and lens supporting means so formed that the major portion of said supporting means is positioned above the useful field of side vision with the said supporting means free from direct connection with the lenses.

Ophthalmic mountings of the above nature are not basically new in the art as many different attempts have been made to form such mountings, particularly mountings having semi-rim sections fitting about the upper contour edges of the lenses and to which the temples are connected. Difficulty, however, was encountered in the construction of some of such mountings, particularly those of the type disclosed herein, in providing a positive, rigid and durable connection of the temple supporting means with the associated parts of the mounting so that the said temple supports will maintain a desired relation with the lenses during use. Difficulty was also encountered in the process of manufacture, that is, in providing a construction which could be quickly and easily assembled and be rigidly and positively securely together. Another difficulty with some of such prior art mountings was in maintaining the bridge sizes to the standards set up in the art and which control the fit of the mounting with the nose and position of the optical centers of the lenses in proper relation with the centers of the pupils of the eyes of the wearer.

It, therefore, is one of the primary objects of the invention to provide a construction of ophthalmic mounting having temple supporting means which are shaped substantially to the upper contour shape of the lenses and which have no positive connection with the lenses whereby the said parts of the mounting may be quickly, easily and positively assembled and secured in desired relation with each other so as to durably maintain the temple supporting means in desired relation with the lenses and yet relieve shock and strain on the lenses during the use of the mounting.

Referring more particularly to the drawings wherein like characters of reference designate like parts throughout the several views, the device embodying the invention comprises broadly a pair of lenses 1 connected to a bridge member 2 by suitable lens straps 3. The lens straps 3 have a pivotal connection 4 with the lens and are provided with resilient means 5 for limiting the pivotal movement of the lens about said pivotal connection and for relieving shock and strain of the lenses during use of the mounting. Relatively long and slender temple supports 6, shaped to substantially the same contour shape as the upper contour edges of the lenses and to lie in the rear of the plane of said lenses, are secured, as illustrated in Figs. IV and V, to the rear of the lens straps 3 and to the sides of the nose pad supporting means or arms 7, as illustrated at 8. The relatively long and slender temple supports 6 may be attached to the lens straps 3 and nose pad supporting arms 7 by soft or hard soldering, or by welding and are provided adjacent their opposite ends with outwardly and rearwardly deflected portions 9 having a pivotal connection 10 with the temples 11.

The long and slender temple supports 6 may be formed of rigid, pliable, ductile or resilient material or may have portions thereof possessing one or more of said characteristics. For example, the portion 12 of said supports 6 adjacent the nasal edges of the lenses might be formed relatively rigid; the intermediate portion 13 shaped substantially to the upper contour shape of the lenses might be formed resilient and the outwardly and rearwardly deflected end 9 formed ductile or pliable. This arrangement would provide sufficient strength and rigidity adjacent the end of the arm connected to the lens straps 3 and nose pad supporting arms 7, as illustrated in Fig. IV, and yet permit the intermediate portion 13 to flex slightly to remove strain at said connection 8 when the mounting is being positioned on or removed from the face with the said ductile or pliable portion being sufficiently adjustable to decrease or increase the distance between the temples to meet the requirements as to the widths of the faces of different individuals.

The means for pivotally connecting the lens straps 3 to the lenses, as illustrated in Fig. IV, comprises a tubular member 14 having a pin member 15 telescopically connected therewith by solder or other suitable adhesive or binding means.

The bridge member 2 is provided with depending side portions 16 which curve rearwardly, as illustrated in Fig. III, to a loop 17 and then turn forwardly at 18 to a loop 19 having a rearwardly turned end 20 secured, as illustrated in Fig. IV, partially to the edge surface of the lens straps 3 or portions thereof overlying the edge of the lens and partially in overlapped relation with the nose pad supporting arms 7. It is to be understood that the said nose pad supporting arms 7 are secured to the edge portion of the lens straps 3, as illustrated at 21, by solder or other suitable means. The end 21 of the nose pad supporting arms 7 is reduced in thickness and the end 20 is provided with a recessed end 22 shaped to receive the end 21 and to overlie a portion thereof. In this construction the end 21 is sandwiched between an overlying portion 23 of the end 20 of the bridge and the edge surface 24 of the strap. The inner end 12 of the temple supports 6, as illustrated at 8, is secured at one of its side surfaces 25 to the rear side surface of the straps 3 and at another of its side surfaces 26 to the outer side surface of the nose pad supporting arms 7 adjacent the straps. The soldering operation for connecting the inner depending end 12 of the temple supports 6, as illustrated at 8, and for connecting the nose pad supporting arms 7 and end 20 of the bridge in assembled relation with each other and with the lens straps 3, may be performed in a single soldering operation with the parts held in desired assembled relation or each of the parts may be soldered separately; it being preferable to hold all the parts in desired assembled relation with each other and then simultaneously solder the parts together. The nose pad supporting arms 7 have suitable nose bearing members or pads 27 pivotally connected thereto as illustrated at 28. It is to be noted that the end portion 21 of the nose pad supporting arms 7, as illustrated in Fig. IV, has substantially parallel outer and inner walls and that the wedged recess or cut out portion 22 of the end 20, which is shaped to fit over said end 21, has a substantially intimate fit therewith with the outer and inner surfaces of the overlying portion 23 substantially parallel with each other.

Fig. V illustrates a slight modification wherein the lens strap 29 has a single ear overlying only one side surface of the lens and is connected to said lens by a screw or other connecting means 30 threadedly connected within a cupped washer 31 having a circumferential edge 32 adapted to engage the opposed side surface of the lens at a distance spaced from the opening in the lens through which the screw 30 extends. It is quite obvious that the threaded shank of the screw might be threadedly connected within the ear or strap 29 and the head of the screw positioned in engagement with the cupped washer 31.

The construction in Fig. V differs slightly from the construction of Fig. IV in that the inner end of the nose pad supporting arms 7 are tapered, as illustrated at 33, and has an angled outer surface fitted with a similarly angled surface 34 on the end 20 of the depending portion of the bridge member. The end 12, of the temple supports 6, has side surfaces soldered, welded or otherwise connected to the rear surface of the lens strap 29 and outer side surface of the nose pad supporting arms 7 in a manner similar to that of the construction illustrated in Fig. IV. It is to be particularly noted that the outer surfaces 35 and 36 of the nose pad supporting arms 7 and ends 20 of the bridge member lie substantially flush with each other.

In Figs. VI and VII there is shown a slight modification wherein the end 38, of the temple supports 6, is secured only to the nose pad supporting arms 7, that is, is secured in varying positions intermediate the attachment of the arms 7 to the lens straps 3 and rearmost end of said arms. In this instance the arms are provided with a portion 39 which is increased in cross-sectional dimension, so as to increase the rigidity thereof, and thereby cause the inner loop portion of the arm 40 to be considerably smaller in cross-sectional dimension than the cross-sectional dimension of the portion 39 so as to permit the arm and nose pad carried thereof to be adjusted independently of the portion 39.

In Fig. VIII there is illustrated a further modification wherein the ends 41 of the temple supports 6 are provided with a reduced angled portion 42, shaped to lie between the end 20 of the bridge and portion of the straps 3, which overlies the edge of the lens. In this instance the portion 42 is sandwiched between the portion 20 and each portion of the lens straps 3 and the nose pad supporting arms 7 is provided with a portion 43 sandwiched between an overlying portion 44 of the end 20 and the deflected portion 42 of the lower end 41 of the temple supports 6. This arrangement is to provide ease in assembling and holding the parts in desired fitted relation with each other prior to the soldering operation. It is apparent that the portions 20 and 7 may be provided with superimposed angled surfaces, such as illustrated at 34 in Fig. V, if desired. It is to be understood that the various assembled parts may be connected by soft soldering, hard soldering or by welding as desired.

The resilient means 5, as illustrated in Figs. III and IV, comprises a plurality of superimposed resilient sections secured intermediate their ends, as by a round, square or rectangular pin member or other means 45, to the portion 24 of the lens straps overlying the edge of the lens. It is to be noted that the portion 24 is in spaced relation with the edge of the lens so as to provide a clearance for free pivotal movement of the lens straps 3 on the lens. In the remaining structure, such as shown in Figs. V, VI, VII and VIII, the lens straps have a rigid connection with the lenses, that is, there is no space between the edge of the lens and the portion of the lens strap overlying said edge. It is to be understood, however, that the lens straps illustrated in Figs. V, to VIII inclusive may be provided with resilient means as desired and may be fitted to the lens straps so that the edge portions thereof are in spaced relation with the lenses. It is also to be understood that any suitable type of connecting means known in the art may be used with all of said structures.

In practice, the temple supporting portions 6 are preferably adjusted to follow the upper contour shape of the lenses in a plane in the rear of said edges. The temple supports have a portion 12 shaped substantially to the inner portion which extends downwardly substantially to the center line of the lenses and have outwardly, downwardly and rearwardly extending portions 9 adjacent the upper temporal edges of the lenses. It will be noted that the said temple supports 6 have a central portion 13 arching upwardly about a relatively long radius 46 and blending into the arc of a shorter radius 47 connecting the depending portions 12 with the portions 13 with the said portions lying in a plane substantially parallel with the plane of the rear surfaces of the lenses and blending into the arc, of a shorter radius 48 than either of the first mentioned radii, connecting the rearwardly extending portion 9 with the intermediate portion 13. The radius 48 is shorter than the radius 47, the radius 47 is shorter than the radius 46 and the said portion 9 extends rearwardly at an angle with the plane of the lenses.

It is to be understood that the central arch portion of the bridge 2 may be formed relatively rigid, ductile or resilient as desired.

The rearwardly extending portions 9 have upper and lower surfaces and side surfaces which blend with and are substantially flush with the adjacent connected end of the temple when the temple is in extended position of use. The temple engaging ends of the arms 9 or portions thereof, having pivotal connections with said temples have a cross-sectional dimension which is greater than the portion of said arms 9 which blend into the intermediate portions 13 of the temple supports 6. There is a continuously decreasing inward taper from the pivotal connection 10 into the intermediate portion 13 substantially throughout the length of the portion 9 so that the parts have a pleasing blended relation with each other. This is best seen in Figs. I and III.

In forming the temple supports 6 the bend of the arc 47 is made in the under surface of the bar material from which the supports 6 are formed and the bend of the arc 48 is made in the rear side surface of said material or in a surface which is substantially normally related with the under surface.

Although applicant has shown and described the temple supports 6 as being shaped to lie in a plane in the rear of the plane of the lenses the said supports may be shaped substantially to the upper contour shape of the lenses and to lie substantially in the plane of the lenses.

From the foregoing description it will be seen that simple, efficient and economical means have been provided for accomplishing all of the objects and advantages of the invention, particularly that of providing the temple supports, lens straps, nose pad supporting arms and bridge member with a relatively positive and durable connection whereby the said parts will be held in desired assembled relation with each other during use and which will enable the said parts to be quickly and easily assembled and secured in said relation.

Having described my invention I claim:

1. In a device of the character described the combination of a pair of lenses having lens holding means resiliently secured thereto, bridge means, and tapered nose pad supporting means, all of said means being secured together at a common point of attachment and temple supporting means secured to said nose pad supporting means adjacent said common point and extending from its point of attachment about the upper contour edges of the lenses said bridge means having a cut out portion in which said tapered support is received.

2. In a device of the character described, the combination of a pair of lenses having lens holding means secured thereto, bridge means, and tapered nose pad supporting means, all said means being secured together at a common point of attachment and temple supporting means secured to said nose pad supporting means adjacent said common point and extending from its point of attachment about the upper contour edges of the lenses said bridge means having a cut-out portion in which said tapered support is received, with said cut-out portion having substantially the shape of the portion of said tapered support positioned therein.

3. In a device of the character described for use with a pair of lenses, lens holding means adapted to be secured to the lenses, bridge means, and tapered nose pad supporting means, all said means being secured together at a common point of attachment and temple supporting means secured to said nose pad supporting means adjacent said common point and so formed as to extend from its point of attachment about the upper contour edges of the lenses when said device is in assembled relation therewith, said bridge means having a cut-out portion in which said tapered support is received, with said cut-out portion having substantially the shape of the portion of said tapered support positioned therein.

4. In a device of the character described for use with a pair of lenses, lens holding means adapted to be secured to said lenses, said lens holding means each having a part shaped to overlie a side surface of a lens and a part shaped to overlie the edge of said lens and having an outer surface so positioned as to be spaced from and to overlie said lens edge in a single plane, bridge means having a recessed surface attached to a portion of said outer lens edge overlying surface, and nose pad supporting means having an end portion contacting said bridge means with at least a portion thereof lying in said recess and also having a surface attached to a portion of said outer lens edge overlying surface of said lens holding means, said attached surfaces of said pad supporting means and bridge being substantially flush, all of said means being secured together at substantially a common point of attachment and temple supporting means secured to a portion of said nose pad supporting means adjacent said common point of attachment and adapted to extend therefrom about the upper contour edges of one of said lenses when said device is in assembled relation therewith.

5. In a device of the character described for use with a pair of lenses, lens holding means adapted to be secured to said lenses, said lens holding means each having a part shaped to overlie a side surface of a lens and a part shaped to overlie the edge of said lens and having an outer surface so positioned as to be spaced from and to overlie said lens edge in a single plane, bridge means having a recessed surface attached to a portion of said outer lens edge overlying surface, and nose pad supporting means having an end portion contacting said bridge means with at least a portion thereof lying in said recess and also having a surface attached to a portion of said outer lens edge overlying surface of said lens holding means, said attached surfaces of said pad supporting means and bridge being substantially flush with said nose pad supporting means having a recessed surface attached to a section and a portion of less cross section spaced from the said bridge abutting portion thereof to which nose pads are connected, all of said means being secured together at substantially a common point of attachment and temple supporting means secured to the relatively large cross section portion of said nose pad supporting means adjacent said common point of attachment and adapted to extend therefrom about the upper contour edges of one of said lenses when said device is in assembled relation therewith.

EDWARD M. SPLAINE.